(12) United States Patent
Hobden et al.

(10) Patent No.: US 7,513,056 B1
(45) Date of Patent: Apr. 7, 2009

(54) SPIRIT LEVEL WITH SLIDING MEASUREMENT SYSTEM

(75) Inventors: Robert J. B. Hobden, Ottawa (CA); Gregory Scott Snider, Bel Air, MD (US)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/933,509

(22) Filed: Nov. 1, 2007

(51) Int. Cl.
*B43L 7/00* (2006.01)
*G01C 9/24* (2006.01)

(52) U.S. Cl. .............................. 33/451; 33/645; 33/613; 33/379; 33/486; 248/466

(58) Field of Classification Search .................. 33/451, 33/351, 354, 374, 379, 381, 483–487, 491, 33/613, 645, 520, 666, 669, 670, 574, 579, 33/333, 334, 404, 27.03, 27.031–27.033, 33/32.1–32.3; 248/466, 475.1, 476, 544, 248/447.1, 477
See application file for complete search history.

(56) References Cited

U.S. PATENT DOCUMENTS

| | | | | |
|---|---|---|---|---|
| 1,777,429 | A * | 10/1930 | Charlton ...................... 33/381 |
| 2,537,473 | A * | 1/1951 | McCusker ............... 33/27.032 |
| 2,748,163 | A * | 5/1956 | Moritz ........................ 33/370 |
| 3,491,448 | A * | 1/1970 | Quinton et al. ............ 33/27.01 |
| 4,326,339 | A * | 4/1982 | Marino ........................ 33/520 |
| 4,648,185 | A * | 3/1987 | Brandimarte ................ 33/669 |
| 5,083,380 | A * | 1/1992 | Robertson ................... 33/562 |
| 5,103,573 | A | 4/1992 | Ehling et al. |
| 6,029,362 | A | 2/2000 | Miodragovic |
| 6,032,378 | A | 3/2000 | Null |
| 6,357,716 | B1 * | 3/2002 | Kratish et al. ............... 248/466 |
| 6,421,927 | B1 | 7/2002 | Bach et al. |
| 6,421,928 | B1 * | 7/2002 | Miller ......................... 33/520 |
| 6,430,827 | B2 | 8/2002 | Ruther |
| 6,606,796 | B2 * | 8/2003 | Stoneberg .................. 33/27.03 |
| 6,739,065 | B2 | 5/2004 | Hoffmeister et al. |
| 6,785,977 | B1 | 9/2004 | Crichton |
| 6,952,887 | B2 | 10/2005 | Muchnik |
| 7,028,413 | B2 * | 4/2006 | Filipescu ..................... 33/528 |
| 7,210,243 | B2 * | 5/2007 | Schmidt et al. ............... 33/613 |

(Continued)

FOREIGN PATENT DOCUMENTS

DE 27 54 427 6/1979

*Primary Examiner*—Amy Cohen Johnson
(74) *Attorney, Agent, or Firm*—Shook, Hardy & Bacon L.L.P.

(57) ABSTRACT

A level is disclosed with a sliding measurement system. The level includes a planar upper surface, a planar lower surface and a web extending between the upper surface and the lower surface. The web includes at least one elongate channel to which a track having an inwardly facing slot is mounted. The level further includes one or more pods slideably received on the track in the inwardly facing slot. The pod includes a generally cylindrical female member having upper and lower ridges extending outwardly therefrom, and a generally cylindrical male member configured to receive a marking instrument, the male member being matingly received in the female member. The upper and lower ridges of the female member are configured to be received in the inner slot of the track and are slideable thereon. The level further includes at least one bubble level vial mounted to the web of the body of the level.

15 Claims, 2 Drawing Sheets

U.S. PATENT DOCUMENTS

| | | |
|---|---|---|
| 2002/0095812 A1 | 7/2002 | Newman |
| 2003/0033722 A1 | 2/2003 | Lanham |
| 2004/0049936 A1* | 3/2004 | Newman ..................... 33/613 |
| 2005/0097765 A1* | 5/2005 | Sorensen et al. .............. 33/666 |

* cited by examiner

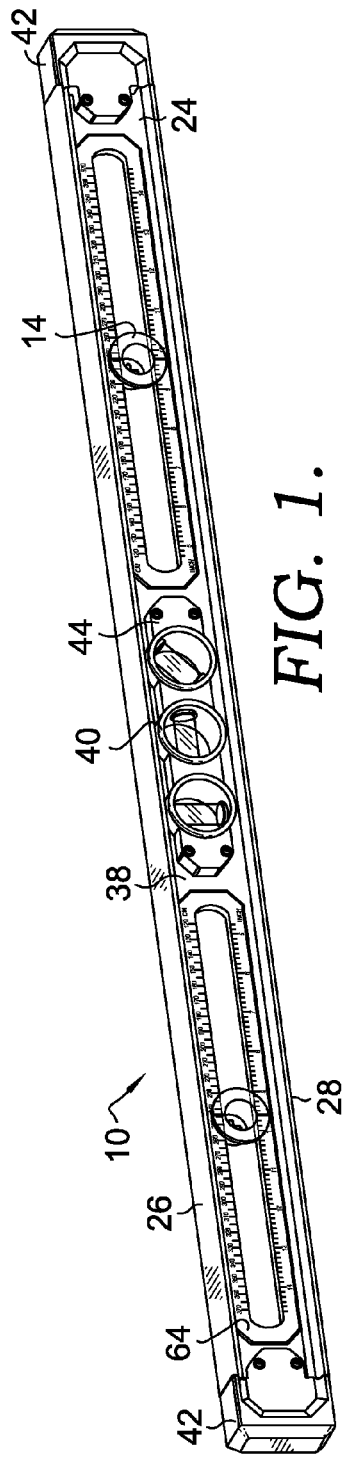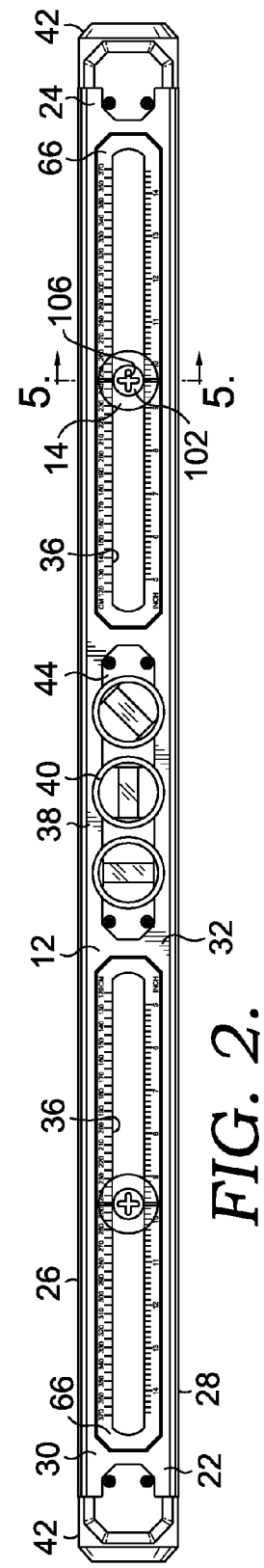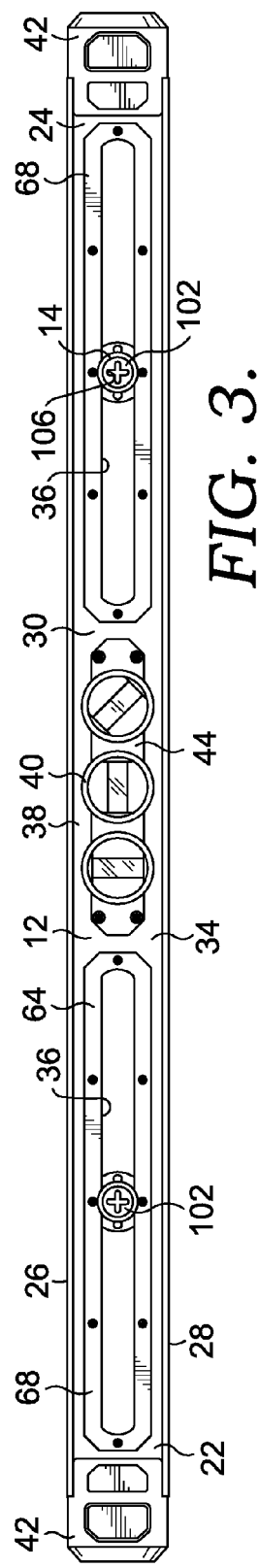

SPIRIT LEVEL WITH SLIDING MEASUREMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention generally relates to spirit levels, and more particularly relates to spirit levels having pods slideable relative to the body of the level for facilitating the hanging of items on a surface.

BACKGROUND OF THE INVENTION

Spirit levels, also known as bubble levels, are typically placed upon a surface to determine whether the surface is level. Based on how levels are configured, the level surface that contacts the surface to be leveled is the top and/or bottom sides of the level. Levels often have a measuring scale added as a convenience to the user.

The present invention is directed to a spirit level having selectively slideable pods to facilitate the placement of leveled marking indicia at an exact spacing.

SUMMARY OF THE INVENTION

The present invention generally relates to a level having a planar upper surface, a planar lower surface and a web extending between the upper surface and the lower surface. The web includes at least one elongate channel to which a track having an inwardly facing slot is mounted. The level further includes one or more pods slideably received on the track in the inwardly facing slot. The pod includes a generally cylindrical female member having upper and lower ridges extending outwardly therefrom, and a generally cylindrical male member matingly received in the female member. The upper and lower ridges of the female member are configured to be received in the inner slot of the track and are slideable thereon. The level further includes at least one bubble level vial mounted to the web of the body of the level.

BRIEF DESCRIPTION OF THE SEVERAL VIEWS OF THE DRAWINGS

The present invention is described in detail below with reference to the attached drawing figures, wherein:

FIG. 1 is a perspective view of an exemplary embodiment of the level of the present invention;

FIG. 2 is a side elevational view of the front face of the exemplary embodiment of the level of the present invention;

FIG. 3 is a side elevational view of the rear face of the exemplary embodiment of the level of the present invention;

DETAILED DESCRIPTION OF THE INVENTION

Figure 4:
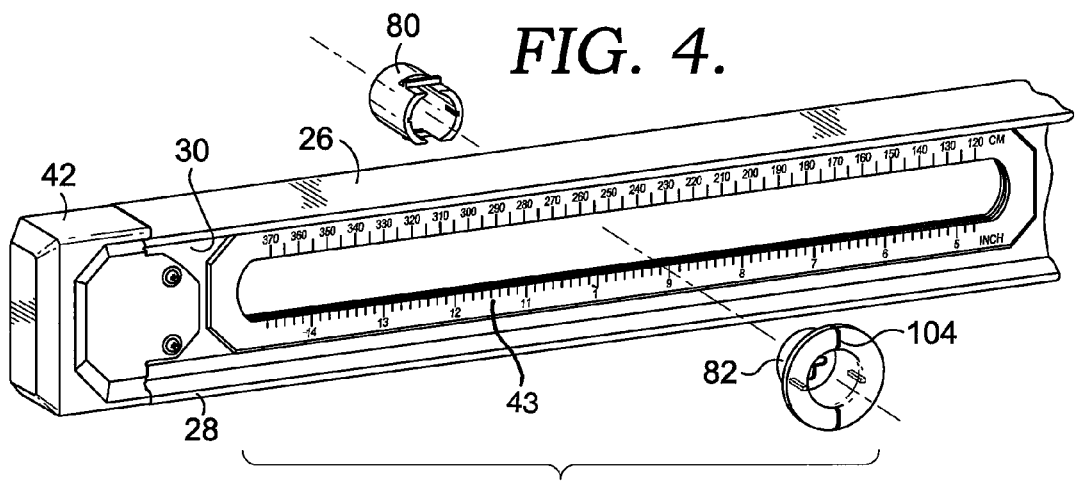
FIG. 4 is a perspective view of the exemplary embodiment showing the pod in a separated state.

While the invention is susceptible to various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring to FIGS. 1-3, an exemplary embodiment of the spirit level 10 of the present invention is indicated generally at 10. The spirit level comprises a body 12 having at least one level vial 40, and at least one marking pod 14 slidably received on the body of the level. The preferred embodiment for the level includes a generally "I" shaped in cross-section elongate body 12, as shown in cross-section in FIG. 5. It is to be understood that other shapes, such as a right-rectangular shape, may be used without departing from the scope of this invention. This body 12 has a first end 22 that extends to a second end 24, a top planar surface 26 opposite a bottom planar surface 28, and a web 30 extending between the top and bottom planar surfaces. A pair of end caps 42 are mounted to the first and second ends 22, 24 of the body 12. Common level lengths include 24-inches, 48-inches, 72-inches, 78-inches and 96-inches. However, other lengths are possible without departing from the scope of the present invention.

Figure 5:
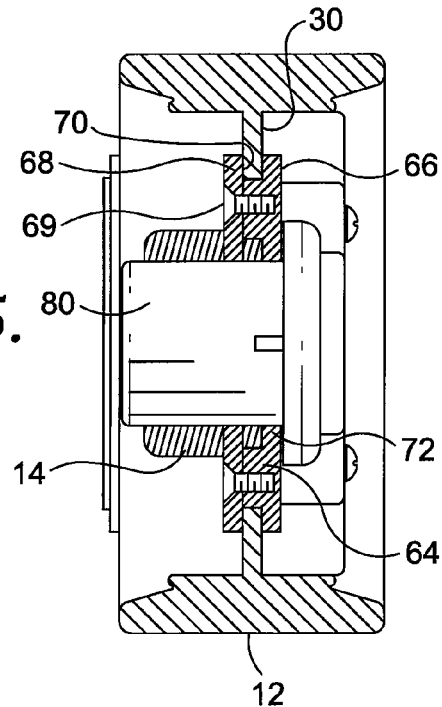
FIG. 5 is a cross-sectional view taken along line 5-5 of FIG. 2.

The web 30 has a first front face 32 opposite a second rear face 34. The first front face 32 is the surface generally facing a user when the level 10 rests against a surface(s) to be marked. The web further includes at least one elongate channel 36 extending through the web from the front face 32 to the rear face 34 and a track 64 mounted to the web 30 such that it defines the outer periphery of the channel 36. As shown in FIGS. 1-3, the level body 12 preferably comprises first and second channels 36 extending on opposite sides of a center web section or hub 38. As shown in FIG. 5, each channel 36 includes a track 64 that has a front portion 66 and a rear portion 68 that are secured by a fastener 69. As combined, front and rear portions 66, 68 define an outer slot 70 operably configured to receive web 30 to mount the track to the web, and an inner slot 72 operably configured to receive the slideable marking pod 14 as will be described in greater detail hereinafter. It is to be understood that alternatively, track 64 may be an integral piece without departing from the scope of the present invention.

Applied to one or both sides of the level 10 above or below each respective channel 36 is a measurement scale 43. The measurement scale 43 is applied to the level body's front face (and/or back face) at a predetermined spacing and may consist of stickers, paint, engravings, or etchings. As shown in FIGS. 1-4, the measurement indicia is preferably applied to the track 64 and includes both a metric and English standard unit scale. Preferably, the measurement indicia is applied such that the scale 43 starts at the midpoint of elongate body 12 and the numbers increasing toward each end, 22, 24. It is to be understood that the scale 43 may be printed in other configuration, such as from the first end to the second end without departing from the scope of the present invention.

The level 10 includes at least one level bubble device 40. Preferably, the level 10 includes three level bubble vials 40 secured in a vial member 44. The vial member 44 may be mounted to the center web of the body 12, and preferably, the vial member 44 is mounted to the web such that it is between the first and second channels 36. These bubble devices are placed at 0 degrees, 45 degrees, 90 degrees, respectively, relative to the bottom planar surface 28 of the body 12. The bubble vials 40 indicate whether a particular planar surface is in a substantially horizontal, vertical or 45-degree position. The vials 40 are viewable from at least the front face so that a user looking at the front face can view the bubble device and determine whether the level top, bottom, first side or second side surface is level. It is to be understood that bubble vials are oft-used in leveling devices and that other leveling indicators, such as electronic indicators, may be used without departing from the scope of the present invention.

Figure 6:
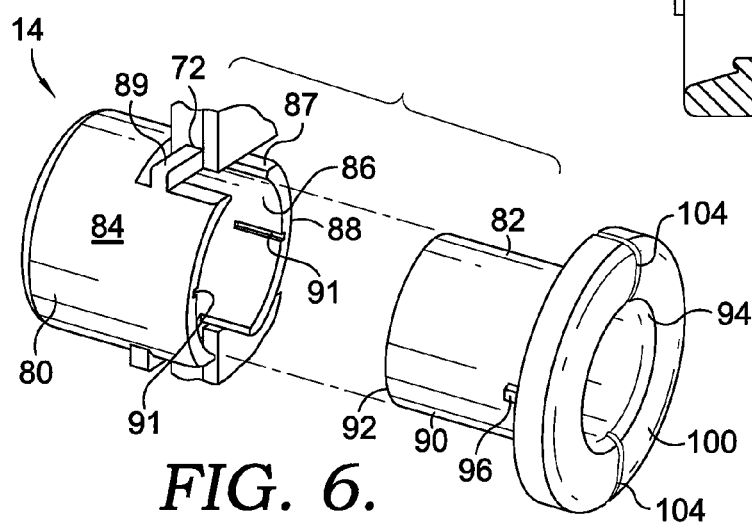
FIG. 6 is a perspective view of the pod with the male member separated from the female member of the pod.

The level 10 of the present invention further comprises at least one marking pod 14 slideably received in a channel 36 of the level. Each marking pod 14 comprises a female member 80 operably configured to be received in track 64, and a second male member 82 mateably received in the first female portion. As shown in FIG. 6, the female member 80 is generally cylindrical and has an outer surface 84, an inner surface 86, upper and lower plateaus 87 formed at a distal end 88 thereof, and upper and lower ridges 89 extending outwardly from the upper and lower plateaus 87. The ridges 89 are operably configured to be received in the inner slots 72 formed by track 64. The inner surface 86 of the female portion 80 is formed with one or more grooves 91 that extend inwardly from the distal end for a span.

Male member 82 comprises a substantially cylindrical body member 90 operably configured to be mateably received by female member 80. Cylindrical member 90 is sized and configured to receive a standard pencil or pen through its interior, as will be described in greater detail hereinafter. Male member 82 includes a distal end 92 and a proximal end 94. At the proximal end 94, the body member 90 further includes one or more ribs 96 that extend longitudinally along member 90. The ribs 96 are configured to be received in the grooves 89 of the female member to prevent rotation of the male portion 82 relative to the female portion 80 of the pod 14.

The male portion 82 further includes a translucent or semi-transparent flange 100 at its proximal end 94 and an end cap 102, shown in FIGS. 2 and 3 at its distal end 92. The flange and end cap 100, 102 may be integrally formed with cylindrical member 90 or may be a separate pieces mounted to the body member 90. The flange 100 extends radially outwardly from the cylindrical member, such that as the male portion 82 is mated with the female portion 80 and mounted to the track 64 of the level, the flange 100 covers a portion of the track 64 both above and below channel 36, as shown in FIGS. 1-5. The flange 100 includes markings 104, such as a vertical line or arrow, that generally corresponds to the midline of the cylindrical body member 90. The markings indicate on the underlying measurement scale 42, which is visible through the flange 100, the distance the midline of the pod 14 is from the midline of the level 10. The end cap 102 substantially encloses the distal end 92 of member 90. The end cap 102 includes a stencil-like opening 106 at the midpoint of the cylindrical member 90. This opening may be formed as a cross, small circle, or any other desired configuration.

In use, a user may set the level 10 against the back of the item desired to be hung. The pods 14 are slid along the track 64 such that the center of each stencil opening 106 on the end cap 102 of the pods are aligned with the center of the fastener or holes on the item. The level then is placed against the wall, raised to the desired height, and leveled using the appropriate vial 50. While the tool is held firmly in place, a pen or pencil may be used to make marks on the wall through the stencil opening 106 in each pod 14. Fasteners placed on these marks will be spaced the proper distance to engage the holes on the back of the item. If the pods are positioned so that they are equidistant from zero on the measurement scale when aligning the stencil openings with the openings/fasteners on the back of the item desired to be hung, the zero point may be used to locate the center of the item (side to side only) with a feature or mark on the wall.

While the preferred embodiment of the present invention is discussed in Imperial measurement terms (inches and feet), the use of such non-metric measurement terminology is not intended to be exclusive but is done for simplification and reader convenience. As such, metric measurements (meters, centimeters, etc.) are considered within (for the purpose of this disclosure) the general terms "inches" and "feet."

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

The invention claimed is:

1. A level comprising:
a body having an upper portion with a planar upper surface, a lower portion with a planar lower surface and a web extending between said upper portion and said lower portion, the web having at least one elongate channel;
a track mounted to the web to define a periphery for a slot, the track defining an inner slot;
at least one pod slideably received in the elongate channel, the pod comprising a generally cylindrical female member having upper and lower ridges extending outwardly therefrom, and a generally cylindrical male member matingly received in the female member, the upper and lower ridges of the female member being operably configured to be received in the inner slot of the track and slidable thereon; and
at least one bubble level vial mounted to the web of the body of the level.

2. The level of claim 1, wherein said body has a generally I-shaped cross-sectional outline.

3. The level of claim 1, wherein the male member comprises a distal end and a proximal end, the distal end being inserted into the female member and comprises an end cap having an opening.

4. The level of claim 3, wherein the proximal end of the male member comprises an outwardly extending flange having indicia positioned thereon, one of said web or track further comprising a measurement scale, the indicia of the flange indicating the distance the pod is from a location on the level.

5. The level of claim 1, wherein the web comprises two elongate channels extending longitudinally from a center web portion of the body, each elongate channel having a pod mounted therein, the pod being slideable from a first position to a second position on the track.

6. The level of claim 1, wherein the track comprises first and second discrete sections, the first and second sections combine to define an upper slot that flanks the web of the body and a lower slot configured to receive the pod.

7. The level of claim 1, wherein the generally cylindrical male member has a body sized to receive a marking instrument.

8. The level of claim 1 wherein the male member comprises a distal end and a proximal end, the distal end being inserted into the female member and comprises an end cap having a midline generally perpendicular the upper and lower portions of the body, the end cap including a stencil opening at the midline, the proximal end of the male member comprises an outwardly extending flange having indicia positioned thereon, the indicia being substantially coplanar with the midline of the end cap.

9. The level of claim 8, wherein one of said web and track further comprises a measurement scale, the indicia of the flange indicating the distance the pod is from a location on the level.

10. A level comprising:
a body having first and second ends, an upper portion with a planar upper surface, a lower portion with a planar lower surface and a web extending between said upper portion and said lower portion, the web having two spaced elongate channels;
at least one pod slideably received in one of the two spaced elongate channels, wherein the pod defines a passageway therethrough and wherein a portion of the passageway is sized to receive a marking instrument therein; and
a vial member comprising at least one bubble level vial mounted to the web of the body of the level, the vial member being mounted between the spaced elongate channels.

11. The level of claim 10, wherein the vial member comprises at least a first and second bubble level vial.

12. The level of claim 11 wherein the first and second bubble level vials are spaced from each other by a first span, the first span being less than a second span defined by the distance from one of the first and second bubble levels to one of the first and second ends of the body.

13. A method for placing indicators on a surface at a proper spacing to mount and level an item having mounting fasteners, the method comprising the steps of:
providing a level having a body having first and second ends, an upper portion with a planar upper surface, a lower portion with a planar lower surface and a web extending between said upper portion and said lower portion, the web having a bubble level vial and a pair of elongate channels, and at least one pod slideably received in one of the elongate channels, wherein the pod defines a passageway therethrough, and wherein a portion of the passageway is sized to receive a marking instrument therein;
placing the pods at a proper spacing by holding the level to the item adjacent the mounting fasteners and sliding the pods such that the pods are aligned with the mounting fasteners; and
indicating on the surface this spacing by holding the level against the surface, leveling the level, and inserting a marking instrument through each pod to indicate on the surface the spacing to mount the item.

14. The method of claim 13, wherein the passageway includes an end cap which substantially encloses an end of the passageway, wherein the end portion includes an opening therethrough, and wherein the opening is smaller in size than the body portion of passageway.

15. The method of claim 14, wherein the opening is in the shape of a cross.

\* \* \* \* \*